Patented Feb. 24, 1942

2,274,267

UNITED STATES PATENT OFFICE 2,274,267

INSECT REPELLENT

Philip Granett, New Brunswick, N. J., assignor to National Carbon Company, Inc., a corporation of New York No Drawing. Original application June 4, 1938, Serial No. 211,819. Divided and this application March 18, 1941, Serial No. 383,921. In Canada March 4, 1937

7 Claims. (Cl. 167—22)

Preparations capable of repelling mosquitoes, flies, gnats, fleas and other insect pests are genuinely valuable in the promotion of health and comfort. This invention is concerned with insect repellents, and its primary object is to provide compositions of improved effectiveness in repelling various insect pests, particularly mosquitoes.

I have found by test that insect repellent compositions of unusual efficacy can be made by employing as their essential ingredients certain esters of dicarboxylic, hydroxy dicarboxylic, and hydroxy carboxylic aliphatic acids, each ester having a total of six to fifteen carbon atoms. It is preferred to select a substance of this class which is relatively non-volatile, or which has a boiling point above about 100° C., and those substances which have but slight odor, or which possess not unpleasant odors are most desirable.

In general, the esters of lactic, malic and adipic acids are preferred, and specific esters of these acids which are useful in making the improved insect repellents are: ethylene glycol monoethyl ether lactate, tetrahydrofurfuryl lactate, benzyl lactate, diethyl dl-malate, dibutyl l-malate, dibutyl dl-malate, diethyl adipate, dipropyl adipate, dibutyl adipate, and di(ethylene glycol monoethyl ether) adipate.

Insect repellent compositions containing this class of substances generally, and dibutyl dl-malate, ethylene glycol monoethyl ether lactate, and diethyl adipate specifically are the subject of my co-pending application Serial Number 211,819, filed June 4, 1938.

This application is specifically directed to insect repellent compositions containing dibutyl l-malate, diethyl dl-malate, benzyl lactate, and tetrahydrofurfuryl lactate.

The advantages realized by employing the above compounds as repellents include the provision of effective repellency against such insects as mosquitoes, house flies, stable flies, black flies and fleas with a minimum of discomfort to the user. The substances named are all relatively non-volatile liquids, and are therefore lasting repellents. Unlike many other repellents, notably essential oils such as citronella, these materials are almost odorless, and, if desired, suitable perfumes may be incorporated. Preparations containing these materials may be placed directly in contact with the skin or clothing since they have, in general, no irritating effect upon the skin or deleterious action on fabrics. On sensitive skin a slight reddening is sometimes caused by the malic acid esters, and the adipic acid esters may produce a momentary smarting sensation. This is particularly true if the esters are applied undiluted. These compounds are not greasy or oily in nature, and they may be easily washed off. Because of their solvent nature they may have a cleansing effect on the skin, and they may tend to soften or dissolve paints and cosmetics with which the repellent comes in contact.

As a rule, it is desirable to incorporate small amounts of certain inert materials, such as vegetable or mineral oils, particularly corn oil, with the repellent because on a dry type of skin these repellents sometimes tend to form a dry white layer two or three hours after application. While this is in no way harmful, it is undesirable from the viewpoint of appearance.

Tests made against salt marsh mosquitoes (Aedes sollicitans) have shown that these compounds are on an average from two to ten times as effective repellents as oil of citronella, or from ten to fifteen times as effective as pine oil or the like. In particular, dibutyl dl-malate has shown an effective repellency of at least five to ten times that of oil of citronella.

Other insects, such as stable flies (Stomoxys calcitrans) and strawberry or deer flies (Chrysop spp.) have been repelled, but against such flies the period of repellency is considerably shorter than against mosquitoes. The species of insect against which protection is sought also influences results. The house mosquito (C. pipiens) bites only at dusk and at night and is relatively easy to repel as compared to the woodland mosquito (A. vexans), which bites during the day as well. From observations in the field, the salt water marsh mosquitoes (A. sollicitans, A. cantator and A. taeniorhynchus) are the fiercest biters and most difficult to repel. They are also active during the day as well as at night.

Although the better repellents are relatively non-volatile (boiling points usually being above about 100° C.) some degree of volatility is necessary to keep the insects—particularly mosquitoes—away from treated parts. Furthermore, odors perceptible to man do not, in themselves, seem to influence mosquitoes to any marked extent. For instance, the odor of citronella will persist long after its repellency has disappeared. Intensity of odor does not seem to affect the insects either, for certain of the butyl compounds have very strong odors yet are not good repellents.

The compounds described may be applied, as such, to surfaces from which it is desired to repel the insect pests. They may also be applied as ingredients of lotions compounded with volatile diluents, such as ethanol, or less volatile materials, such as glycerol, or they may be mixed with one another. In general, dilution with inert materials reduces the effect of repellency of the compound. The repellents may be applied in combinations with various oily carriers, including vegetable oils, such as castor oil and peanut oil, and certain mineral oils. Unguents or creams containing the repellents, as well as powders or carriers of like nature may be effectively used. In any of the different modes of application, it will be understood that mixtures or blends of the individual repellents may be employed.

My invention is not limited to the specific substances named, and it includes modifications within its scope as defined by the appended claims.

This application is a division of my copending application Serial No. 211,819, filed June 4, 1938, which, in turn, contains subject matter in common with my application Serial No. 68,191, filed March 11, 1936, with which it was copending.

I claim:

1. An insect repellent composition which contains one of the group consisting of dibutyl l-malate, diethyl dl-malate, benzyl lactate, and tetrahydrofurfuryl lactate.

2. An insect repellent composition which consists of an inert diluent and an active repellent ingredient from the group consisting of dibutyl l-malate, diethyl dl-malate, benzyl lactate and tetrahydrofurfuryl lactate.

3. An insect repellent composition which consists of an inert diluent and a repellent; said diluent containing an oil; and said repellent being from the group consisting of dibutyl l-malate, diethyl dl-malate, benzyl lactate, and tetrahydrofurfuryl lactate.

4. An insect repellent composition which consists of an inert diluent and a repellent; said diluent containing a vegetable oil; and said repellent being from the group consisting of dibutyl l-malate, diethyl dl-malate, benzyl lactate, and tetrahydrofurfuryl lactate.

5. An insect repellent composition which contains diethyl dl-malate.

6. An insect repellent composition which contains tetrahydrofurfuryl lactates.

7. An insect repellent composition which contains benzyl lactate.

PHILIP GRANETT.

CERTIFICATE OF CORRECTION.

Patent No. 2,274,267. February 24, 1942.

PHILIP GRANETT.

It is hereby certified that error appears in the printed specification of the above numbered patent requiring correction as follows: Page 2, second column, line 25, claim 6, for the word "lactates" read --lactate--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.